(12) United States Patent
Kobayashi

(10) Patent No.: US 9,230,202 B2
(45) Date of Patent: Jan. 5, 2016

(54) IMAGE PROCESSING APPARATUS, METHOD, AND PROGRAM PRODUCT PERFOMING COLOR CONVERTION DEPENDING ON INPUT IMAGE DATA MODIFICATION IN ACCORDANCE WITH DISPLAY DEVICE

(71) Applicant: CANON KABUSHIKI KAISHA, Tokyo (JP)

(72) Inventor: Masato Kobayashi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/480,627

(22) Filed: Sep. 8, 2014

(65) Prior Publication Data

US 2015/0077771 A1 Mar. 19, 2015

(30) Foreign Application Priority Data

Sep. 17, 2013 (JP) .................................. 2013-192245

(51) Int. Cl.
*H04N 1/60* (2006.01)
*G06K 15/02* (2006.01)
*H04N 1/00* (2006.01)

(52) U.S. Cl.
CPC ........ *G06K 15/1878* (2013.01); *G06K 15/1882* (2013.01); *H04N 1/00482* (2013.01); *H04N 1/6008* (2013.01); *H04N 1/6052* (2013.01)

(58) Field of Classification Search
None
See application file for complete search history.

(56) References Cited

U.S. PATENT DOCUMENTS

| 8,014,027 | B1 * | 9/2011 | Kulkarni et al. | 358/1.9 |
| 8,441,682 | B2 * | 5/2013 | Chung et al. | 358/518 |
| 2002/0145744 | A1 * | 10/2002 | Kumada et al. | 358/1.9 |
| 2007/0052987 | A1 * | 3/2007 | Jung | 358/1.9 |
| 2011/0299100 | A1 * | 12/2011 | Chung et al. | 358/1.9 |
| 2013/0321873 | A1 * | 12/2013 | Ido | 358/3.27 |

FOREIGN PATENT DOCUMENTS

| JP | 2004-090423 A | 3/2004 | |
| JP | 2009147613 A * | 7/2009 | H04N 1/46 |

* cited by examiner

*Primary Examiner* — Scott A Rogers
(74) *Attorney, Agent, or Firm* — Fitzpatrick, Cella, Harper & Scinto

(57) ABSTRACT

Provided is an image processing apparatus that includes a first color space converting unit configured to convert image data constituted by a color space for printing into image data constituted by a color space for display; and a second color space converting unit configured to convert image data constituted by the color space for display into image data constituted by the color space for printing.

7 Claims, 15 Drawing Sheets

IMAGE PROCESSING APPARATUS, METHOD, AND PROGRAM PRODUCT PERFOMING COLOR CONVERTION DEPENDING ON INPUT IMAGE DATA MODIFICATION IN ACCORDANCE WITH DISPLAY DEVICE

BACKGROUND OF THE INVENTION

1. Field of the Invention

The present invention relates to an image processing technique that modifies a difference in color between image data constituted by a color space for printing and a display image on a monitor in a simple fashion when printing the image data.

2. Description of the Related Art

Conventionally, image data constituted by an RGB color space or a CMYK color space has been typically handled by electrophotographic printers, inkjet printers, and the like. Image data constituted by an RGB color space (hereinafter referred to as "RGB data") is normally used as office document, photographic images, and the like in many applications. Thus, upon printing RGB data, it is often required that RGB data is produced with a color reproduction close to the color impression of a display image on a monitor. On the other hand, image data based on the assumption that the image data is output from a printer, such as image data for commercial purposes, is often image data constituted by a CMYK color space (hereinafter referred to as "CMYK data"). PDL data submitted in a page description language (PDL) represented by Adobe Systems' PostScript (registered trademark) or the like is often image data constituted by a standardized CMYK color space based on the assumption that the PDL data is output from a predetermined printer.

In recent years, there has been an increasing opportunity of handling CMYK data on an application due to the enhanced function of the application. However, upon printing image data, the user may be unaware of the fact that image data is CMYK data (e.g., when a person who created image data is different from a person who prints it). For example, assume the case where the user prints image data with the same color as that of a display image on a monitor. When CMYK data is printed by a printer compatible with PostScript (registered trademark), CMYK data may be printed in a different color from that of a display image on a monitor. This is because CMYK data described in PostScript (registered trademark) is transmitted to a printer as it is without performing color space conversion assumed to be displayed on a monitor. Thus, there is a technique for analyzing a color space relating to image data upon printing and informing the user of the result of analysis in advance (see Japanese Patent Laid-Open No. 2004-090423).

In the conventional technique, even when the user can recognize the possibility that the color of image data may be different from that of a display image on a monitor prior to printing, the user needs to modify image data using a specific application in order to modify the color thereof. Since such modification requires some knowledge or technique, a typical user cannot readily modify the color of image data when the user is aware of the fact that the color of image data is different from that of a display image on a monitor.

SUMMARY OF THE INVENTION

The present invention provides an image processing technique that modifies a difference in color between image data constituted by a color space for printing and a display image on a monitor in a simple fashion when printing the image data.

According to an aspect of the present invention, an image processing apparatus is provided that includes a first color space converting unit configured to convert image data constituted by a color space for printing into image data constituted by a color space for display; and a second color space converting unit configured to convert image data constituted by the color space for display into image data constituted by the color space for printing.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings. In the following embodiments, a description will be given by taking an example of an image processing apparatus that performs color matching and color space conversion when printing PDL data submitted in a page description language (PDL).

Note that image data constituted by a color space for printing is illustrated as CMYK data and image data constituted by a color space for display in a display device is illustrated as RGB data.

(First Embodiment)

Figure 1:
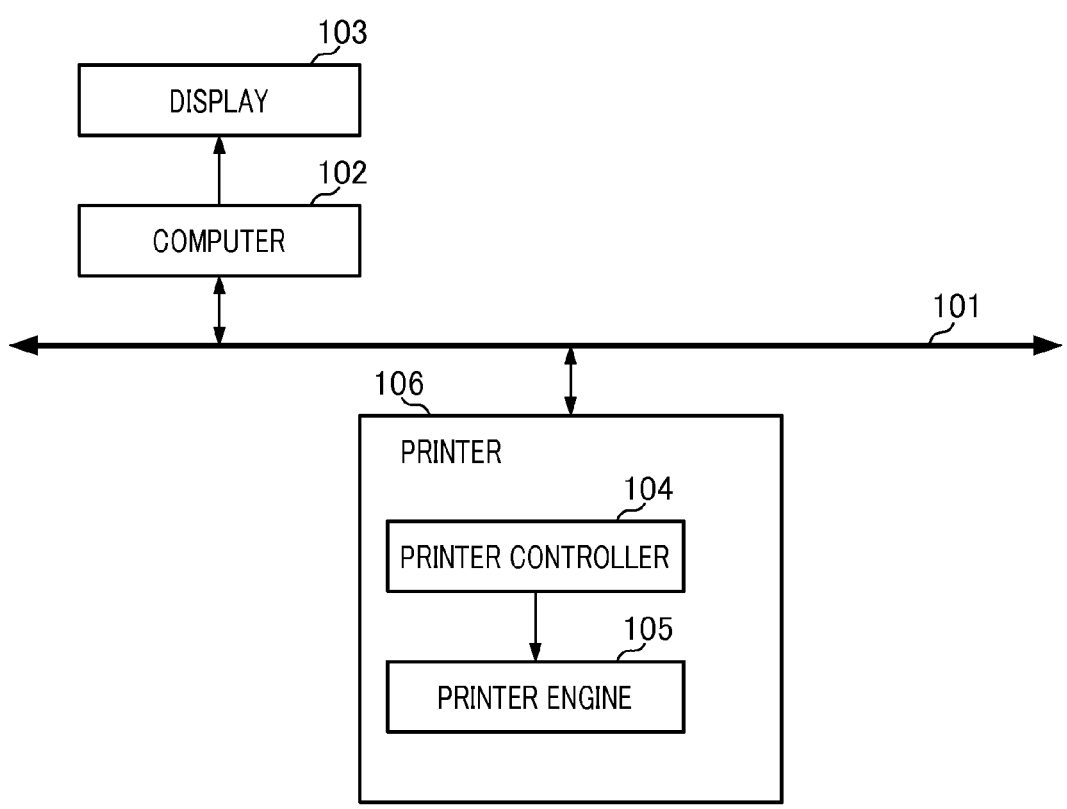
FIG. 1 is a diagram illustrating an example of a configuration of an image forming system in order to explain a first embodiment of the present invention in conjunction with FIGS. 2 to 7.

FIG. 1 is a system configuration diagram illustrating an example of a configuration of an image forming system including an image generating apparatus according to a first embodiment of the present invention. The image forming system according to the present embodiment includes a computer 102 and a printer 106 which are communicably connected to each other via a network 101.

The printer 106 includes a printer controller 104 and a printer engine 105. The computer 102 can transmit a print instruction to the printer 106. The computer 102 can acquire information about the printer 106. The computer 102 and a display 103 are connected to each other, and the computer 102 outputs an image signal for display to the display 103. For example, the computer 102 transmits screen information about a running application to the display 103, and the display 103 performs screen display.

The printer controller 104 is connected to the printer engine 105 and transmits a control signal to the printer engine 105 to cause it to execute print processing.

Figure 2A:
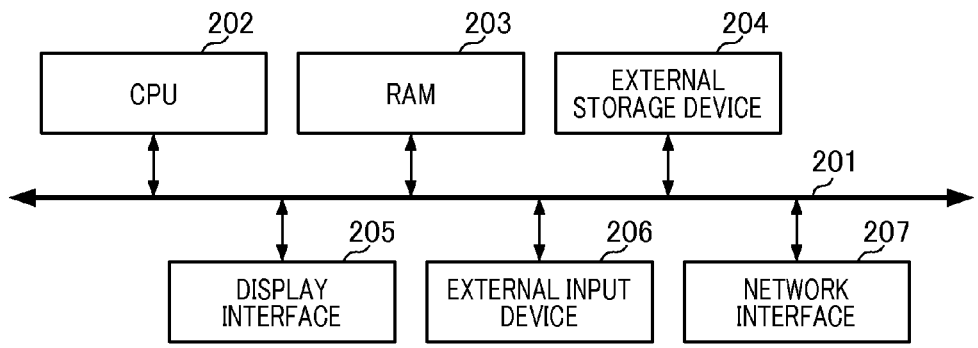
FIG. 2A is a block diagram illustrating an example of a configuration of a computer 102 shown in FIG. 1.

FIG. 2A is a block diagram illustrating a physical configuration of the computer 102. The computer 102 includes components connected to an internal bus 201. A CPU (Central Processing Unit) 202 has a central control function. Each of a RAM (Random Access Memory) 203 and an external storage device 204 constitutes a storage unit. In addition, the computer 102 includes a display I/F (Interface) unit 205, an external input device 206, and a network I/F unit 207. The network I/F unit 207 is connected to the network 101 and transmits/receives data to/from the printer 106.

Upon activation of the computer 102, the CPU 202 reads an application execution program from the external storage device 204 and then stores the program in the RAM 203 for execution. The program executed by the CPU 202 starts transmission of screen display data to the display I/F unit 205, so that an image is displayed on the screen of the display 103. The CPU 202 also monitors user input information from the external input device 206. Upon input of user input information, the CPU 202 executes processing which is described in the program and corresponds to the user input information.

Figure 2B:
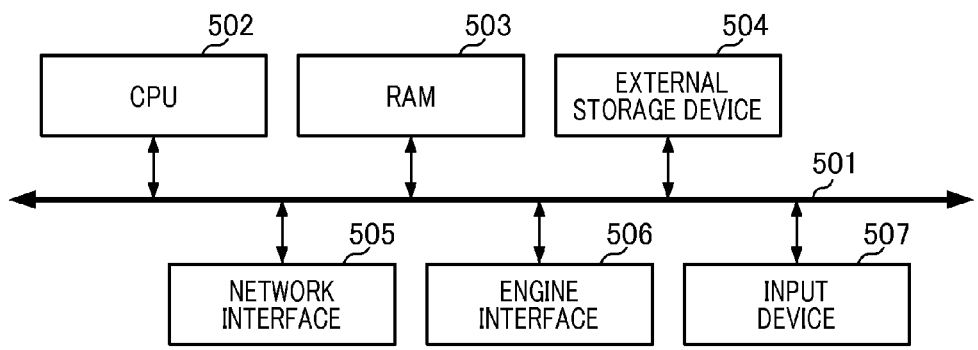
FIG. 2B is a block diagram illustrating an example of a configuration of a printer controller 104 shown in FIG. 1.

FIG. 2B is a block diagram illustrating a physical configuration of the printer controller 104. The printer controller 104 includes components connected to an internal bus 501. A CPU 502 interprets and executes a program developed into RAM 503. Furthermore, the printer controller 104 includes an external storage device 504, a network I/F unit 505, an engine I/F unit 506, and an input device 507. Upon activation of the printer controller 104, the CPU 502 reads an execution program from the external storage device 504 and then stores the program in the RAM 503 for execution.

Figure 3:
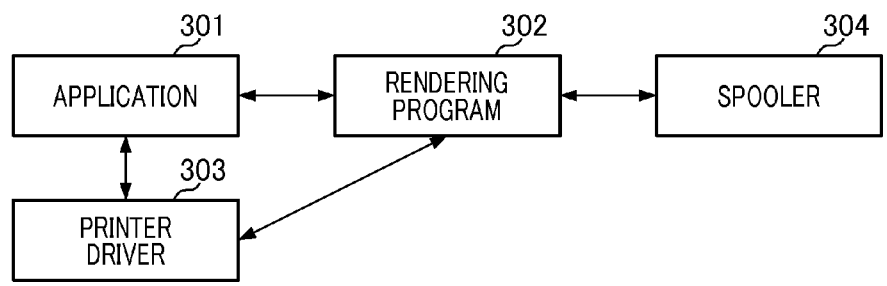
FIG. 3 is a block diagram illustrating an example of a configuration of a program.

FIG. 3 is a block diagram illustrating an example of a system configuration of a program executed by the CPU 202. An application 301 is software that runs on an operating system (hereinafter referred to as "OS") which is basic software for the computer 102. Examples of the application 301 include software for document creation, software for drawing creation, software for presentation, and the like. In the present embodiment, assume the case where the application 301 itself generates print data. The application 301 acquires information about a user operation instruction in a GUI (Graphical User Interface) environment via, for example, the display I/F unit 205 or the external input device 206. The user may perform processing such as image editing by copying image data stored in the external storage device 204 to the RAM 203 using the application 301.

A rendering program 302 is a sub-system (basic function group) of OS that supervises image information processing such as display on the display 103, printing to a printer, or the like. The rendering program 302 is an output module unique to OS and is a Graphic Device Interface (GDI) in Windows (registered trademark) OS from Microsoft Corporation and is QuickDraw or Quartz Extreme in Macintosh (registered trademark) OS from Apple Inc. The application 301 uses the basic function group so that rendering information can be output without dependence on a device.

The rendering program 302 is dynamically linked to a device driver (not shown) of a specified device such as a display, a printer, or the like for use so as to perform output processing for the device. For example, when data is output to the printer 106, the rendering program 302 executes output processing for a printer driver 303. In the present embodiment, the rendering program 302 is mainly used for converting CMYK data into RGB data. Data output from the rendering program 302 is stored in a spooler 304 as required. When there is no need to convert CMYK data into RGB data, the function of the rendering program 302 is not used. The printer driver 303 has the function of displaying and controlling a print setting screen for determining how and in what settings print data is generated. Setting information specified on a print setting screen is reported to the application 301. The application 301 receives print data generated on the basis of setting information, and outputs the print data to the printer controller 104 via the network I/F unit 207.

Figure 4A:
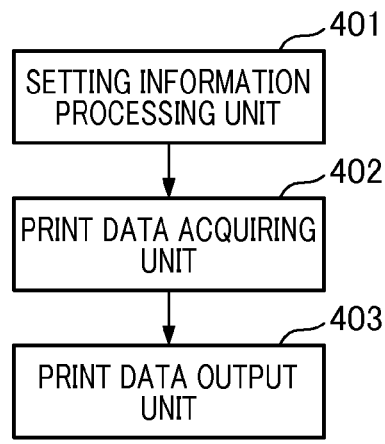
FIGS. 4A and 4B are block diagrams illustrating module configuration.

FIG. 4A is a block diagram illustrating an example of a module configuration of the printer driver 303. The printer driver 303 is constituted by a setting information processing unit 401, a print data acquiring unit 402, and a print data output unit 403. The setting information processing unit 401 causes the display 103 to display a print setting screen, and notifies the application 301 of print setting information input by a user operation. The print data acquiring unit 402 acquires print data created by the application 301 based on the print setting information, and then output the print data to the print data output unit 403. The print data output unit 403 outputs print data received from the print data acquiring unit 402 to the network I/F unit 207 so as to transmit the print data to the printer controller 104.

Figure 4B:
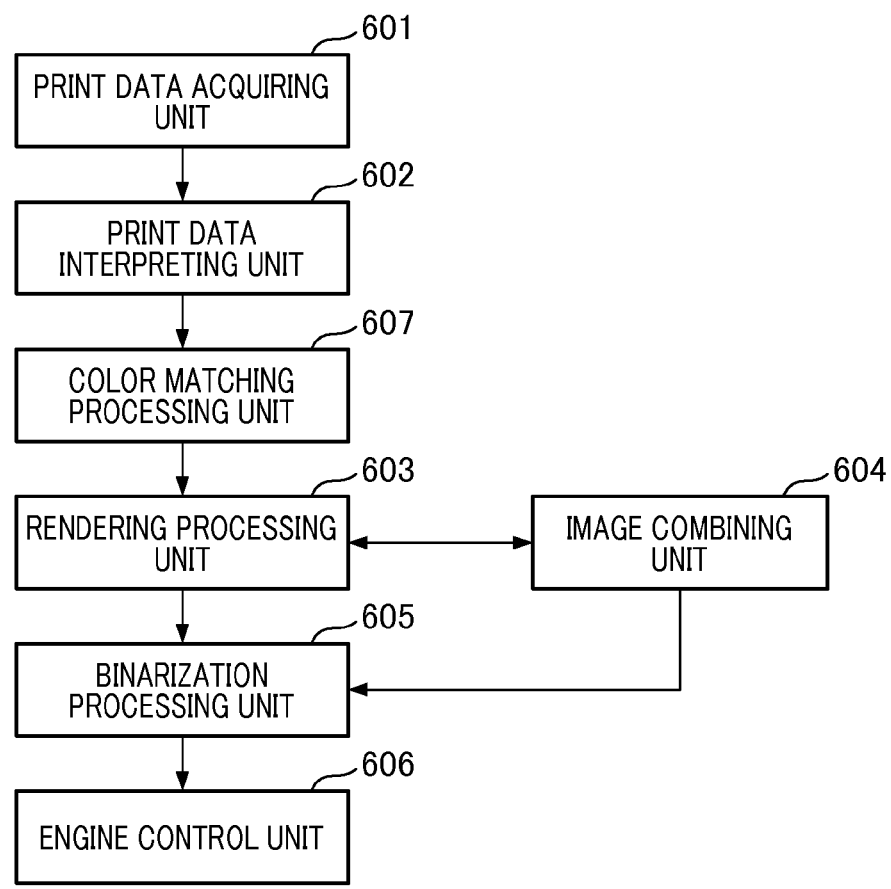

FIG. 4B is a block diagram illustrating an example of a module configuration of a program executed by the CPU 502 of the printer 106. The processing executed by each module is implemented by utilizing the RAM 503 as a work area. The program is constituted by a print data acquiring unit 601, a print data interpreting unit 602, a rendering processing unit 603, an image combining unit 604, a binarization processing unit 605, an engine control unit 606, and a color matching processing unit 607.

The print data acquiring unit 601 receives print data received by the network I/F unit 505 and then output the print data to the print data interpreting unit 602. The print data interpreting unit 602 interprets a printing command acquired from the print data acquiring unit 601, switches processing depending on the type of the printing command, and then passes color information to the color matching processing unit 607. The color matching processing unit 607 performs conversion processing for converting print data into density image data of a coloring material (ink, toner, etc.) handled by the printer engine 105, and then outputs a rendering command. The rendering processing unit 603 executes rendering into an image memory for one page in accordance with the rendering command. Here, when the image combination is required, the data subjected to rendering is passed to the image combining unit 604. Image combination is performed when there are two kinds of data obtained by rendering data which is firstly converted from CMYK data into RGB data and then is converted into CMYK data again by the color matching processing unit 607 and CMYK data with no conversion. The image combining unit 604 combines the data subjected to rendering, which has been received from the rendering processing unit 603, and outputs the combined data as one data to the binarization processing unit 605. When no image combination is performed, the rendering processing unit 603 outputs the data subjected to rendering directly to the binarization processing unit 605. The binarization processing unit 605 converts the data subjected to rendering or the combined data into a dot matrix pattern image, and then outputs the dot matrix pattern image to the engine control unit 606. The engine control unit 606 outputs a control instruction given to a printer engine to the engine I/F unit 506 based on the dot matrix pattern image. The printer engine 105 forms the image on a paper sheet as an ink image or a toner image.

Figure 5:
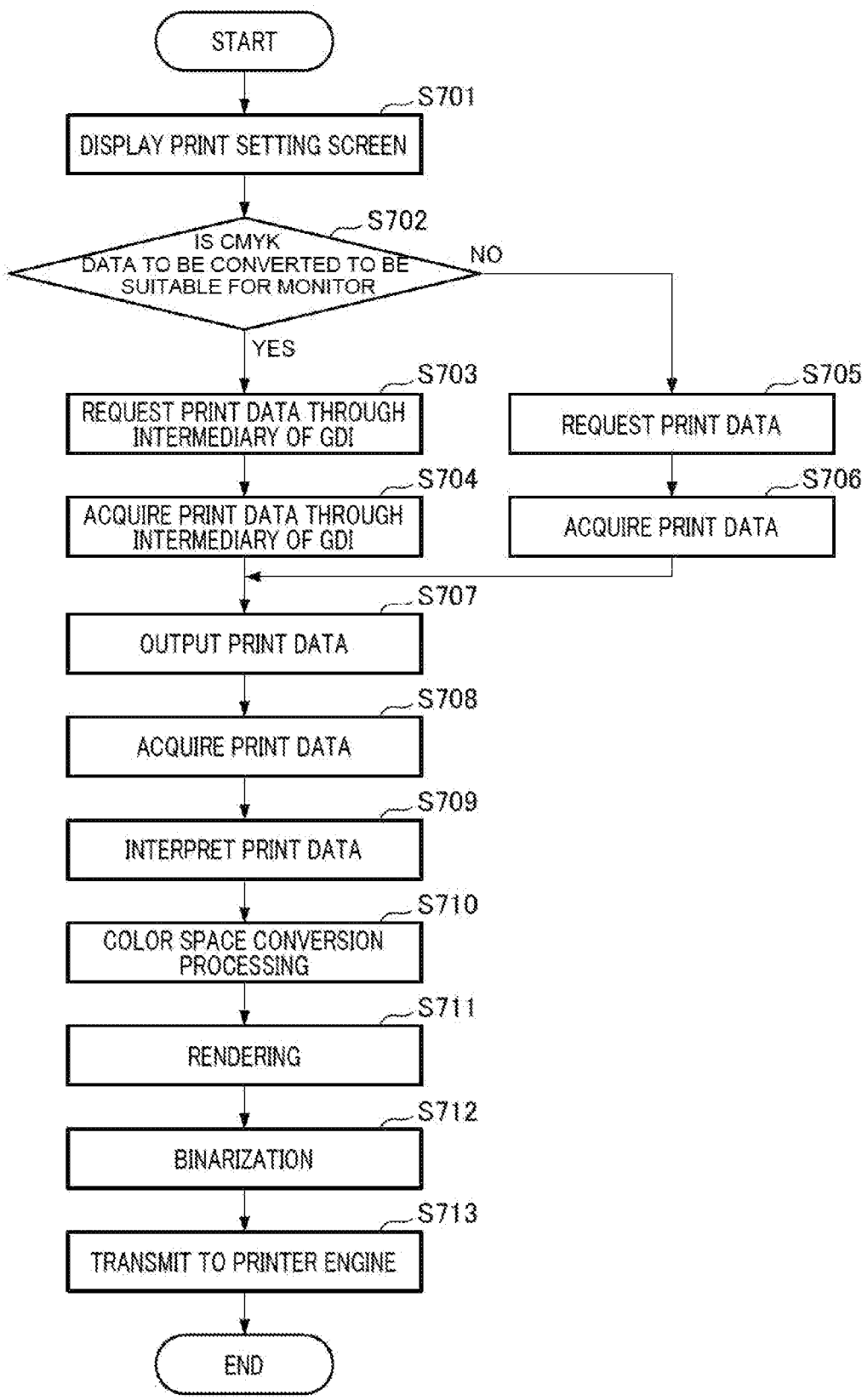
FIG. 5 is a flowchart illustrating the flow of print processing.

Next, a description will be given of the flow of print processing according to the present embodiment with reference to the flowchart shown in FIG. 5. The processing includes processing for converting CMYK data into RGB data to be displayed on a monitor screen. In the print processing, the printer driver 303 performs the processing from step S701 to step S707, and the printer controller 104 performs the processing from step S708 to step S713.

Figure 6:
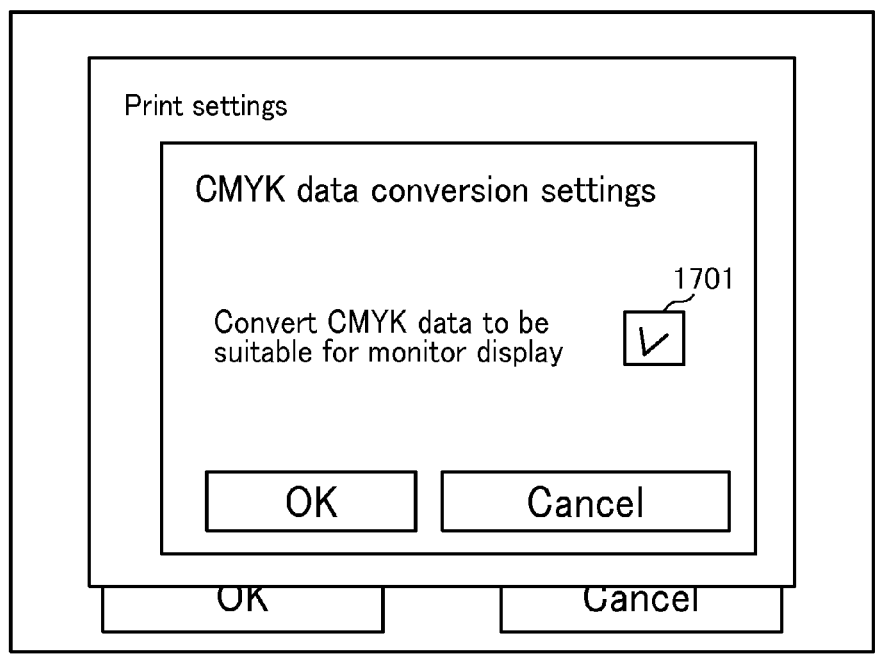
FIG. 6 is a diagram illustrating an example of display of color space conversion settings on a UI screen.

In step S701, the setting information processing unit 401 displays a print setting screen on the display 103 in accordance with a print instruction given from the application 301, and then accepts input from a user. For example, the setting information processing unit 401 presents the user interface (UI) screen shown in FIG. 6 to the user, and then accepts the input to a check box 1701 relating to setting information. In step S702, the setting information processing unit 401 determines whether or not the settings for converting CMYK data into RGB data (data converted from CMYK into RGB by the application 301 and the rendering program 302 so as to make it display on a monitor) are made. In other words, the setting information processing unit 401 determines whether or not the color of image data constituted by a color space for printing is modified in accordance with a display device. More specifically, when a check mark is set on the check box 1701 shown in FIG. 6 by a user operation, the color space conversion processing is executed, whereas when no check mark is set, the setting information processing unit 401 determines that no conversion is needed. When the settings for converting CMYK data into RGB data are set, the processing proceeds to step S703, whereas when no such settings are in effect, the processing shifts to step S705.

In step S703, the print data acquiring unit 402 requests print data through the intermediary of the rendering program 302 from the application 301. The application 301 generates print data through the intermediary of the rendering program 302 in response to the request. When CMYK data is present, the application 301 can generate print data, which is obtained by converting CMYK data into the same RGB data as that for being displayed on a monitor, through the intermediary of the rendering program 302. In step S704, the print data acquiring unit 402 acquires the print data generated through the intermediary of the rendering program 302 from the application 301, and then stores the print data in the external storage device 204. The print data is stored in the external storage device 204 up until step S707.

When no settings for converting CMYK data into RGB data are made in step S702, the print data acquiring unit 402 requests normal print data from the application 301 in step S705. Normal print data refers to print data which is converted from CMYK data or RGB data of an input image as it is without the intermediary of the rendering program 302. The application 301 generates print data without the intermediary of the rendering program 302 in response to the request. In step S706, the print data acquiring unit 402 acquires the generated normal print data from the application 301.

After steps S704 and S706, the print data output unit 403 outputs the print data acquired from the application 301 to the print data acquiring unit 601 as it is in step S707. The print data acquiring unit 601 is one of modules constituting the printer controller 104. When it is determined in step S702 that the settings for converting CMYK data into RGB data are made, the print data is output through the intermediary of the rendering program 302. If otherwise, normal print data is output. In step S708, the print data acquiring unit 601 acquires the print data output from the print data output unit 403 of the printer driver 303, and then stores the print data in the external storage device 504. The print data is stored in the external storage device 504 up until step S713. Likewise, attribute data to be described below is also stored in the external storage device 504.

Figure 7:
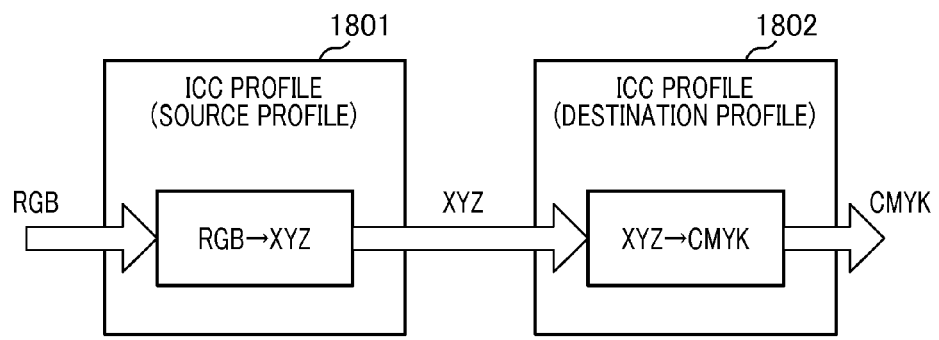
FIG. 7 is an explanatory diagram illustrating color space conversion using the ICC profile.

In step S709, the print data interpreting unit 602 interprets the print data acquired in step S708. Interpretation of print data refers to determine whether print data is constituted by either a CMYK color space or an RGB color space or to determine the attribute (image, text, or the like) of print data. The print data interpreting unit 602 instructs the color matching processing unit 607 to perform color space conversion processing based on the interpreted content. In step S710, the color matching processing unit 607 converts print data from data constituted by a RGB color space into data constituted by a CMYK color space in accordance with the instruction given by the print data interpreting unit 602. Color space conversion is performed based on conversion information about conversion from RGB to CMYK, which is described in the ICC profile stored in the external storage device 504. The ICC profile refers to a profile for color space conversion defined by the International Color Consortium (ICC). A description will be given of color space conversion processing using the ICC profile with reference to FIG. 7. There are two ICC profiles: a source profile 1801 and a destination profile 1802. Color space conversion from RGB to CMYK is performed by combining these two profiles. The source profile 1801 has a Look Up Table (hereinafter abbreviated as "LUT") for conversion from RGB to XYZ, and performs calculation for color space conversion using the LUT. XYZ is a device-independent color space which is referred to as a Profile Connection Space (PCS) in the definition of the ICC profile and serves to connect two profiles. The destination profile 1802 has the LUT for conversion from XYZ to CMYK, and performs calculation for color space conversion using the LUT. The color matching processing unit 607 sends print data subjected to color space conversion as a rendering command to the rendering processing unit 603. In step S711, the rendering processing unit 603 performs rendering (data writing) processing into an image memory in accordance with the rendering command received from the color matching processing unit 607. At this time, the rendering processing unit 603 generates data (attribute data) which corresponds to rendering data and represents attribute information about pixels, and stores the generated data together with rendering data. The rendering processing unit 603 sends the generated rendering data to the binarization processing unit 605. In step S712, the binarization processing unit 605 converts the received rendering data into a dot matrix pattern image, and then outputs the dot matrix pattern image to the engine control unit 606. In step S713, the engine control unit 606 outputs a control instruction given to a printer engine to the engine I/F unit 506 based on the dot matrix pattern image. In this manner, the printer engine 105 forms the image on a paper sheet as an ink image or a toner image.

In the present embodiment, RGB data which is generated by conversion from CMYK to RGB upon image display is acquired through the intermediary of a rendering program in accordance with the request from the application during print processing. In this manner, the same color space conversion processing as that for RGB data can also be performed for CMYK data. According to the present embodiment, even when the user does not have high level knowledge and technique relating to color modification or even when the user does not use a specific application, color modification for modifying the color of CMYK data to be closer to the color impression of a display image on a monitor can be performed.

(Second Embodiment)

Next, a description will be given of a second embodiment of the present invention.

In the first embodiment, print data is output through the intermediary of the rendering program 302 or normal print data is output depending on the settings for converting CMYK data into RGB data. In other words, there is a selection for either conversion of all CMYK data into RGB data or no data conversion. However, the user may request to wish to output a portion of CMYK data as it is instead of converting all CMYK data into RGB data. For example, when text or the like is converted into RGB data, the converted text cannot hold pure chromaticity, resulting in an adverse effect on appearance. Accordingly, in the present embodiment, a description will be given of processing capable of selecting the use of either CMYK data prior to conversion or RGB data subjected to conversion depending on the attribute of print data. Hereinafter, a description of the same processing as that in the first embodiment will be omitted and a description will be given of the points of difference. Since the system configuration or the like is the same as that in the first embodiment, a detailed description will be omitted by using reference numerals already used for the structural elements that are identical to the case of the first embodiment. Duplicate descriptions will be similarly omitted in the embodiments to be described below.

Figure 8:
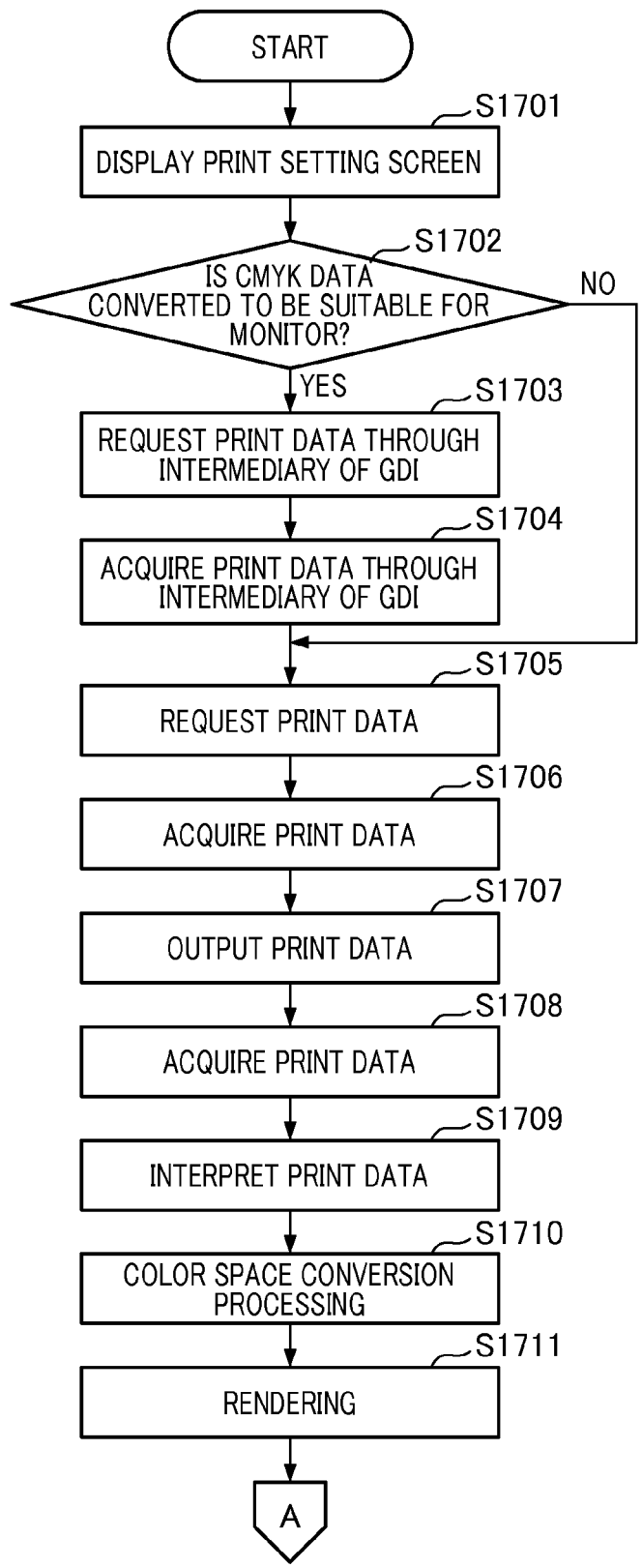
FIG. 8 is a flowchart illustrating the first half of print processing in order to explain a second embodiment of the present invention in conjunction with FIG. 9 to FIG. 13.

A description will be given of the flow of print processing according to the present embodiment with reference to the flowchart shown in FIGS. 8 and 9. The processing from step S1701 to step S1703 is the same as that from step S701 to step S703 shown in FIG. 5 and the explanation thereof will be omitted.

In step S1704, the print data acquiring unit 402 acquires the generated print data from the application 301 through the intermediary of the rendering program 302, and stores the print data in the external storage device 204. Here, information indicating that CMYK data has been converted into the same RGB data as that for being displayed on a monitor is added to print data through the intermediary of the rendering program 302. After the processing in step S1704, the processing in step S1705 is executed regardless of settings for converting CMYK data into RGB data (even when "NO" is determined in step S1702) in contrast to the first embodiment. The processing from step S1705 to step S1711 is the same as that from step S705 to step S711 shown in FIG. 5 and the explanation thereof will be omitted. In step S1712 shown in FIG. 9, the rendering processing unit 603 determines the presence or absence of information indicating that CMYK data has been converted into the same RGB data as that for being displayed on a monitor generated in step S1704. When the information is present, the processing proceeds to step S1713, whereas when the information is absent, the processing shifts to step S1715.

In step S1713, the rendering processing unit 603 sends data (print data obtained through the intermediary of the rendering program 302 and data obtained by rendering normal print data) to which rendering into an image memory has performed to the image combining unit 604. The image combining unit 604 calculates difference information by comparing rendering data acquired from the rendering processing unit 603 on a pixel-by-pixel basis to generate image data (difference data) representing difference information. A difference between pixels corresponding to each other is calculated, so that information about the fact that conversion from CMYK data to RGB data is performed for which pixel can be extracted.

Figure 10:
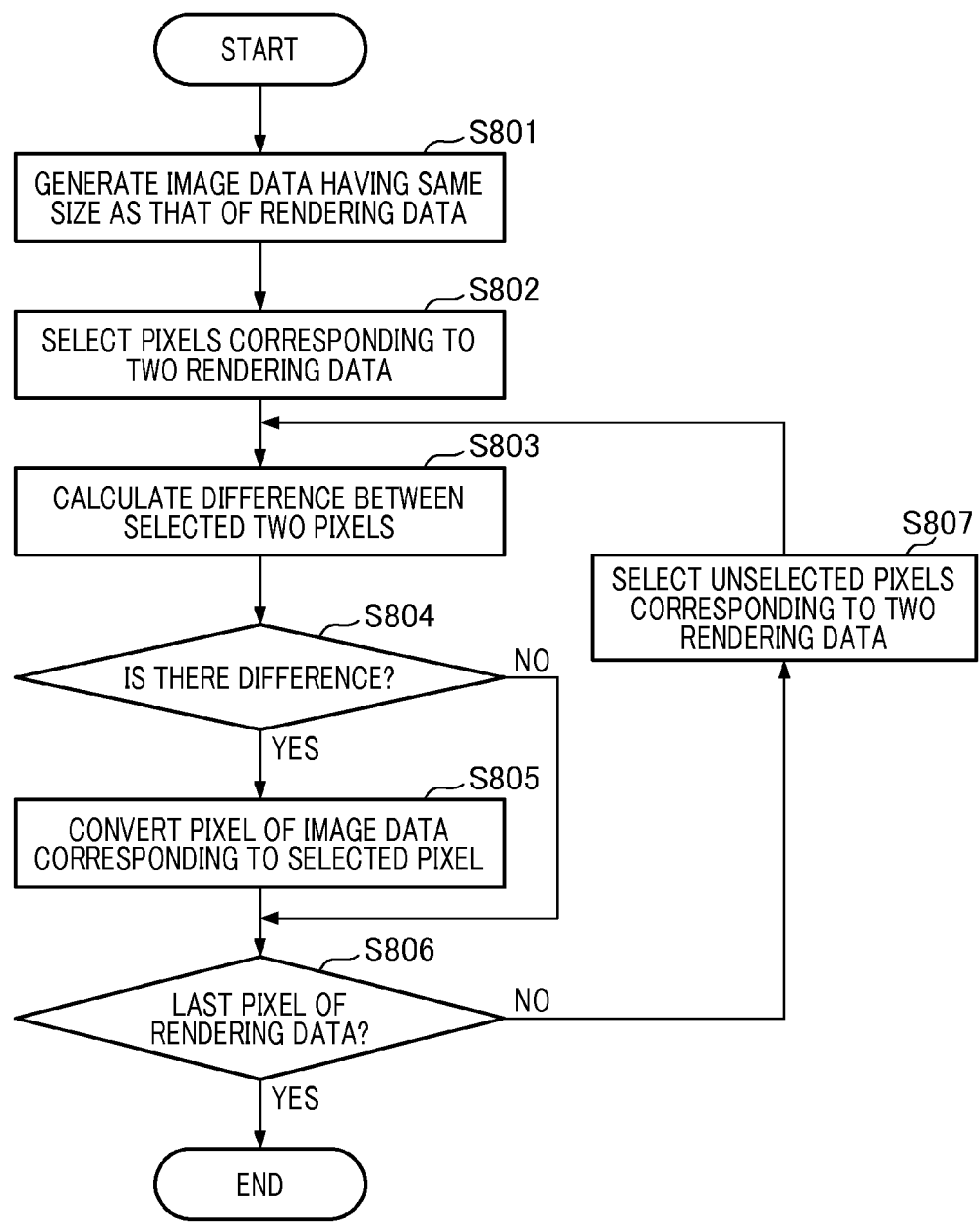
FIG. 10 is a flowchart illustrating difference data generation processing.

A description will be given of difference data generation processing with reference to the flowchart shown in FIG. 10. The processing is performed by the image combining unit 604. In step S801, the processing for generating (difference) image data having the same size as that of rendering data is performed. The image data is binary data and the initial value for all the image data is constituted by 0. In step S802, the processing for selecting pixels corresponding to two rendering data (see step S1713) is executed. Firstly, the first pixel in each of the two rendering data is selected. In step S803, a difference between the selected two pixels is calculated. In step S804, the determination processing for determining whether or not the difference calculated in step S803 is zero is performed. If the difference is non-zero, it is determined that there is a difference, and the processing proceeds to step S805. If the difference is zero, it is determined that there is no difference, and the processing shifts to step S806.

Figure 11:
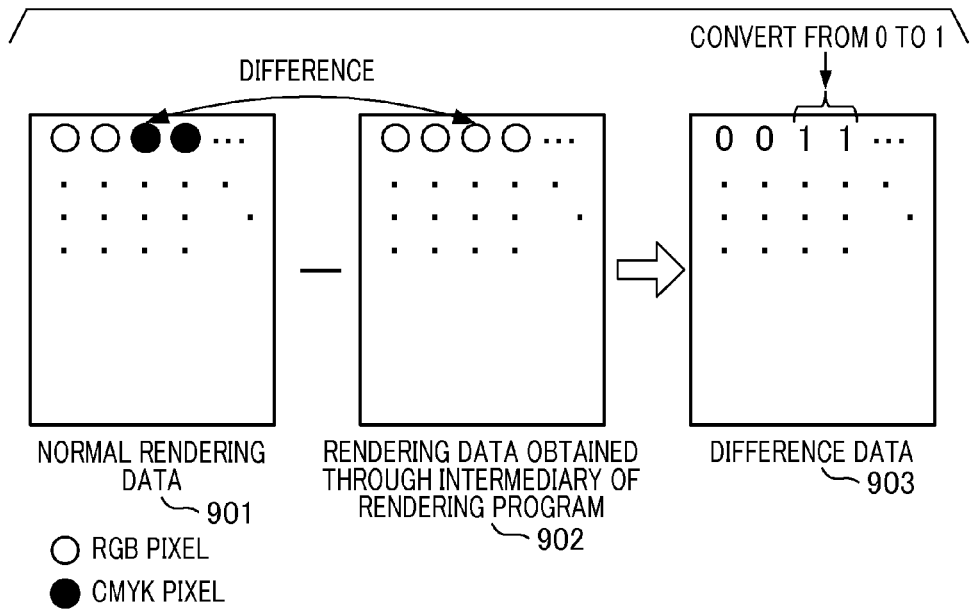
FIG. 11 is a diagram illustrating difference data generation processing.

In step S805, a value corresponding to the pixel selected in the image data generated in step S801 is converted. A specific description thereof will be given with reference to FIG. 11. FIG. 11 illustrates normal rendering data 901, rendering data 902 obtained through the intermediary of the rendering program 302, and difference data 903. An open circle represents an RGB pixel, and a black circle represents a CMYK pixel. When the initial value for the difference data 903 is zero but there is a difference between pixels of the selected rendering data, the value corresponding to the pixel at the position is changed from zero to one. Then, the processing proceeds to step S806 shown in FIG. 10. In step S806, the determination processing for determining whether or not all the pixels have been selected is performed. When the processing for selecting all the pixels is performed, the processing ends. If otherwise, the processing shifts to step S807. In step S807, unselected pixels in two rendering data for comparison are newly selected, and then the processing returns to step S803.

Figure 9:
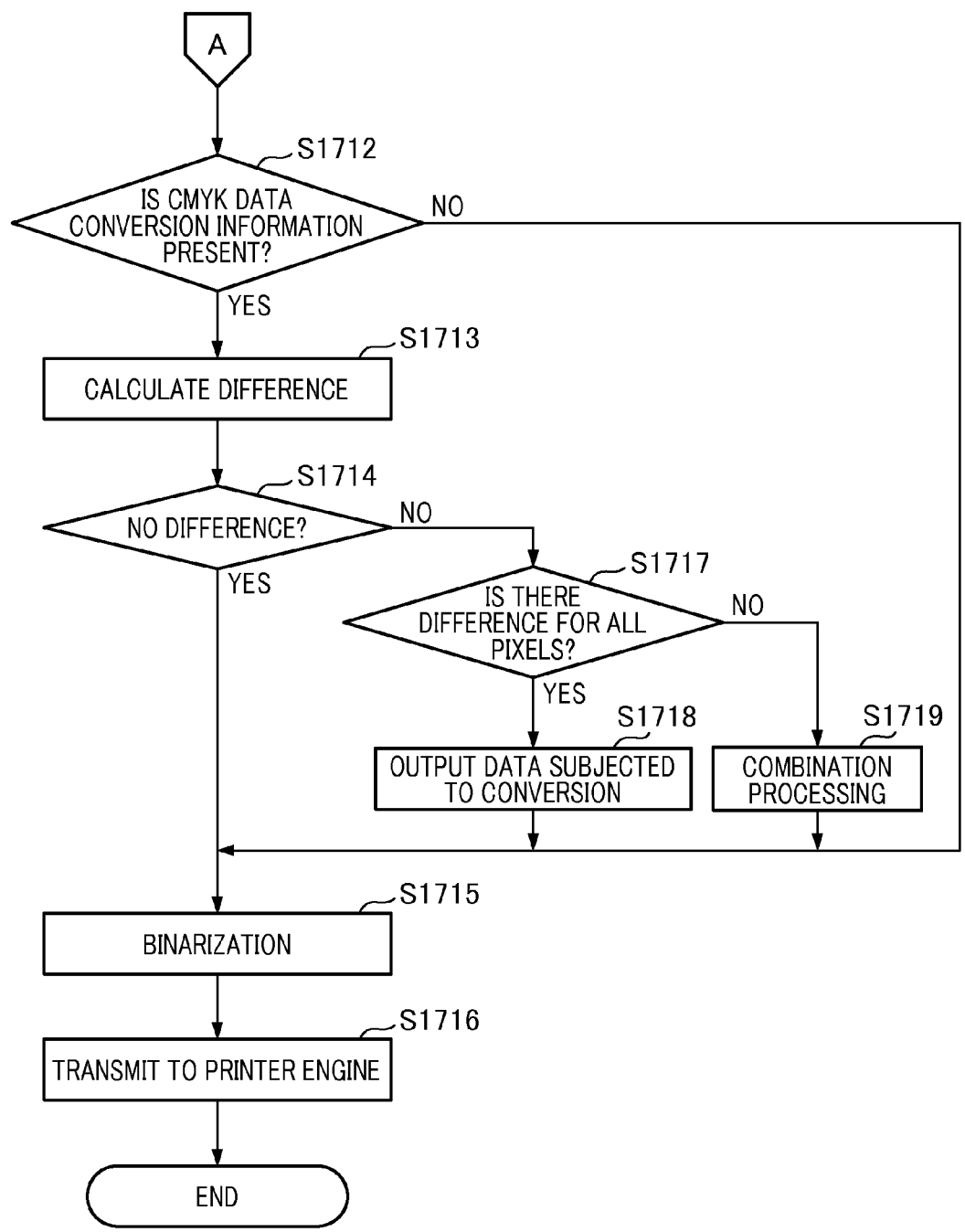
FIG. 9 is a flowchart illustrating the latter half of print processing in sequence of FIG. 8.

After generation of difference data, the processing proceeds to step S1714 shown in FIG. 9, and the image combining unit 604 determines whether or not there is the difference calculated in step S1713. When the values of all the difference data are zero, the image combining unit 604 determines that there is no difference. On the other hand, when there is a pixel having a difference data value of 1, the image combining unit 604 determines that there is a difference. When there is no difference, the processing proceeds to step S1715. Data obtained by rendering normal print data into an image memory is sent to the binarization processing unit 605 as it is.

Data obtained by rendering print data obtained through the intermediary of the rendering program 302 into an image memory is discarded.

When it is determined in step S1714 that there is a difference, the processing proceeds to step S1717, and the image combining unit 604 determines whether or not there is a difference for all the pixels. When all the difference data values generated in step S1713 are one, the image combining unit 604 determines that there is a difference for all the pixels, and the processing proceeds to step S1718. When there is no difference in all the pixels (when the difference is zero), the processing proceeds to step S1719.

In step S1718, the image combining unit 604 sends rendering data (first rendering data obtained by rendering into an image memory) relating to print data obtained through the intermediary of the rendering program 302 to the binarization processing unit 605. Rendering data (second rendering data obtained by rendering into an image memory) relating to normal print data is discarded.

Figure 12:
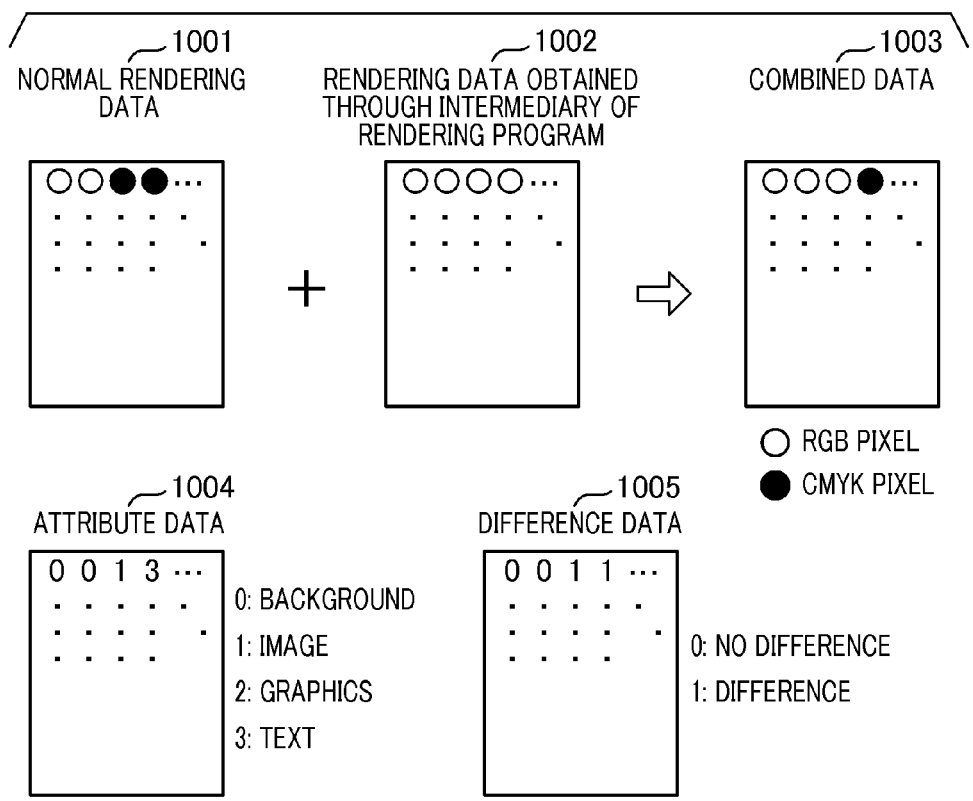
FIG. 12 is a diagram illustrating combined data generation processing.

In step S1719, the image combining unit 604 performs processing for combining two rendering data. Two rendering data are combined based on the attribute data generated in step S1711 and the difference data generated in step S1713. More specifically, combination processing is performed as shown in FIG. 12. FIG. 12 illustrates normal rendering data (second rendering data) 1001, first rendering data 1002 obtained through the intermediary of the rendering program 302, and combined data 1003 obtained by combining the normal rendering data 1001 with the first rendering data 1002. Attribute data 1004 and difference data 1005 are shown in the bottom part of FIG. 12. In the attribute data 1004, reference numerals "0", "1", "2" and "3" represent background, image, graphics, and text, respectively.

Figure 13:
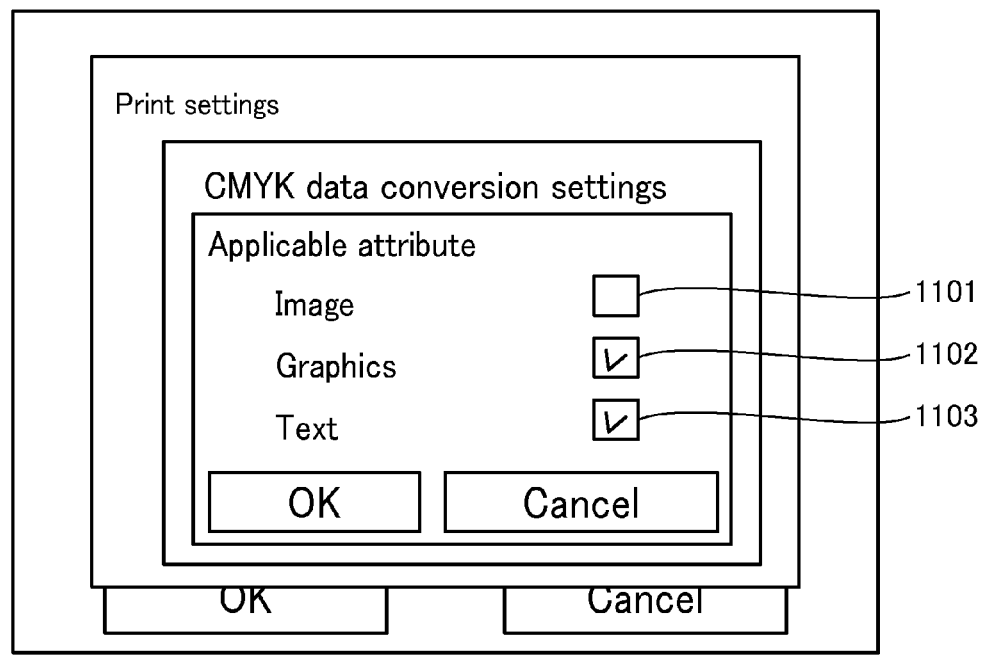
FIG. 13 is a diagram illustrating an example of a display screen for selecting an attribute.

For the pixels of which the attribute data 1004 is "3" indicating text and the difference data 1005 is "1" indicating that there is a difference, pixels of second rendering data 1001 (i.e., CMYK data) are employed. For other pixels, pixels of the first rendering data 1002 are employed. In this manner, the combined data 1003 is generated upon completion of the combination processing for the entire pixels by combining the respective pixels in sequence. Here, when the attribute value is text, the pixels of the second rendering data 1001 are employed in consideration of pure chromaticity or the like of text. The present invention is not limited thereto, but the UI screen shown in FIG. 13 may also be displayed such that the user can select as to which rendering data is to be employed depending on its attribute. FIG. 13 illustrates three types of applicable attribute: image, graphics, and text. The user can set a check mark for each of a check box 1101 corresponding to attribute of image, a check box 1102 corresponding to attribute of graphics, and a check box 1103 corresponding to attribute of text.

The image combining unit 604 sends the generated combined data to the binarization processing unit 605. The processing in steps S1715 and S1716 shown in FIG. 9 is the same as that in steps S712 and S713 shown in FIG. 5 and the explanation thereof will be omitted.

According to the present embodiment, whether the use of CMYK data prior to conversion or the use of RGB data subjected to conversion can be selected depending on attribute information about print data. Although this results in an increase in the amount of processing correspondingly, CMYK data can be output for an image portion at which CMYK data wants to be output as it is in accordance with the user's intention such as when it is desired to maintain pure chromaticity of text, resulting in an increase in convenience to the user.

(Third Embodiment)

Next, a description will be given of a third embodiment of the present invention.

In the first embodiment, print data obtained by converting CMYK data into RGB data is acquired from an application. In this case, the color space conversion processing is performed by a computer utilizing the application and the rendering program, resulting in an increase in the processing load on the computer as compared with the case where no color space conversion processing is performed. In general, a printer can perform the color space conversion processing faster than a computer. The processing speed of the entire print processing may become slow with an increase in the processing load on the computer. Accordingly, in the present embodiment, information about color space conversion from CMYK to RGB performed by an application is acquired in advance, and the acquired information is stored in a printer so that the color space conversion processing is performed by the printer. Hereinafter, a description will be given of processing for decreasing the processing load on a computer so as to improve the processing speed of the entire print processing.

A description will be given of the flow of print processing according to the present embodiment with reference to the flowchart shown in FIGS. 14 and 15.

Figure 14:
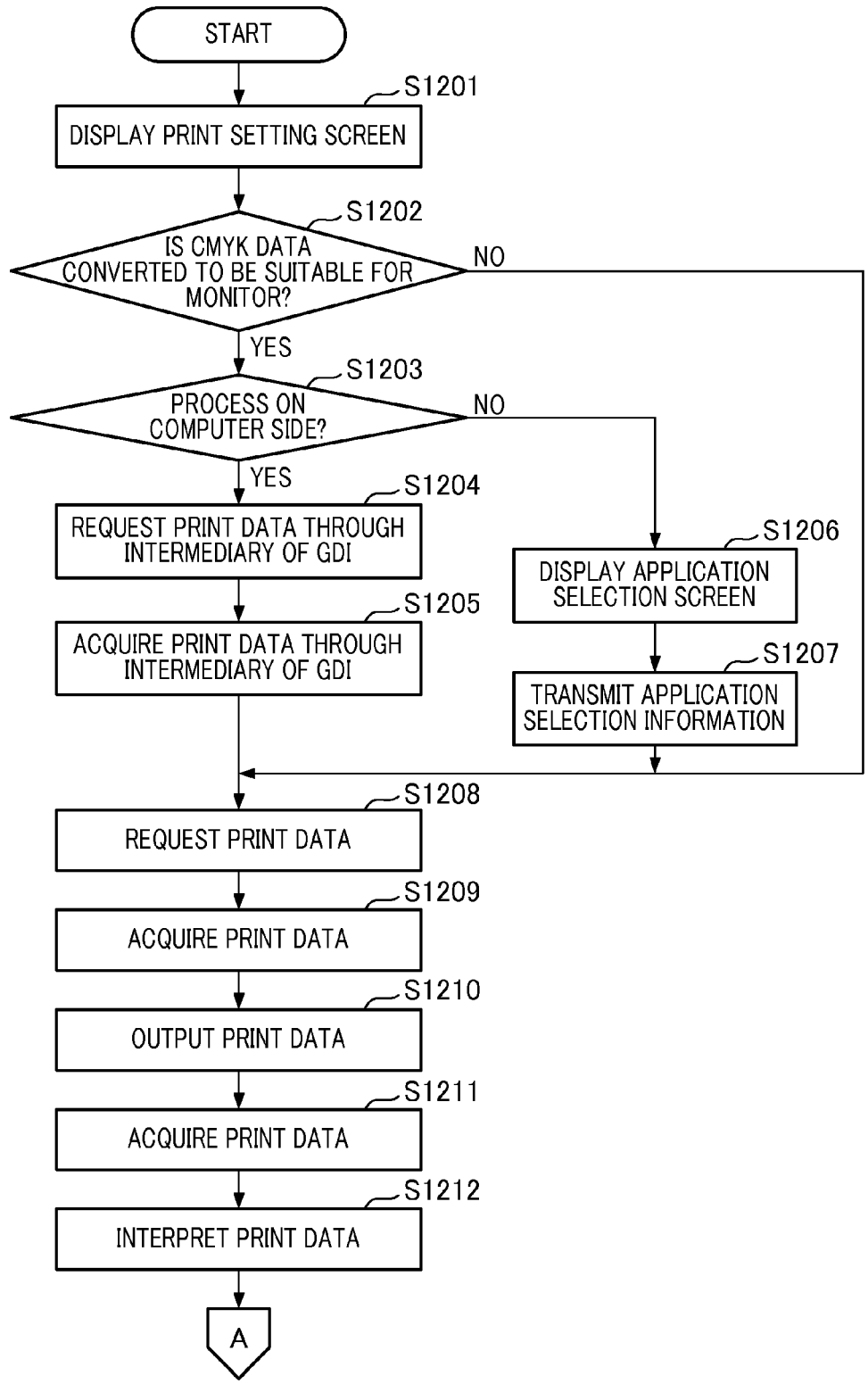
FIG. 14 is a flowchart illustrating the first half of print processing in order to explain a third embodiment of the present invention in conjunction with FIG. 15 to FIG. 18.
Figure 16A:
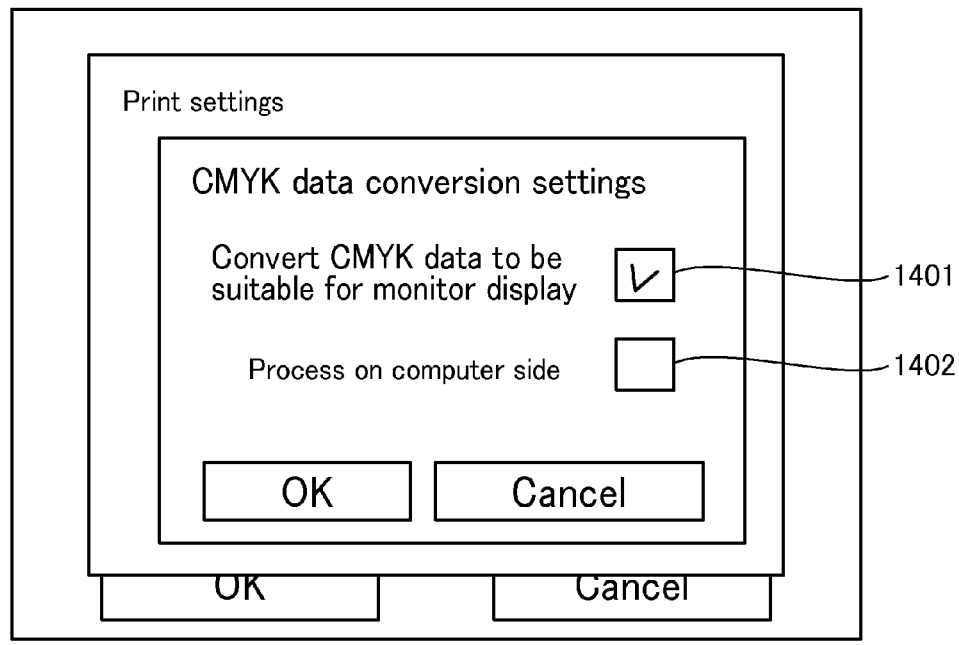
FIG. 16A is a diagram illustrating color space conversion settings on a display screen

In step S1201 shown in FIG. 14, the setting information processing unit 401 displays a print setting screen on the display 103 in accordance with a print instruction given from the application 301, and then accepts input from a user. For example, the user interface (UI) screen shown in FIG. 16A is displayed on the display 103. In this display example, a check box 1401 indicating whether or not "CMYK data is adjusted to be suitable for display on the monitor" and a check box 1402 indicating whether or not "processing is performed on the computer side" are displayed to accept input from a user. In step S1202, determination processing for determining whether or not CMYK data is converted to be suitable for display on the monitor is performed. When a check mark is entered in the check box 1401 shown in FIG. 16A, the processing proceeds to step S1203, whereas when no check mark is entered, the processing shifts to step S1208.

In step S1203, the setting information processing unit 401 determines whether or not the processing for converting CMYK data into RGB data is performed on the computer side. When a check mark is entered in the check box 1402 corresponding to "the processing is performed on the computer side" shown in FIG. 16A, it is determined that the processing is performed on the computer side, whereas when no check mark is entered, it is determined that the processing is performed on the printer side. When it is determined that the processing is performed on the computer side, the processing in step S1204 (request for acquiring print data through the intermediary of GDI) and the processing in next step S1205 (acquires print data through the intermediary of GDI) are executed.

Figure 16B:
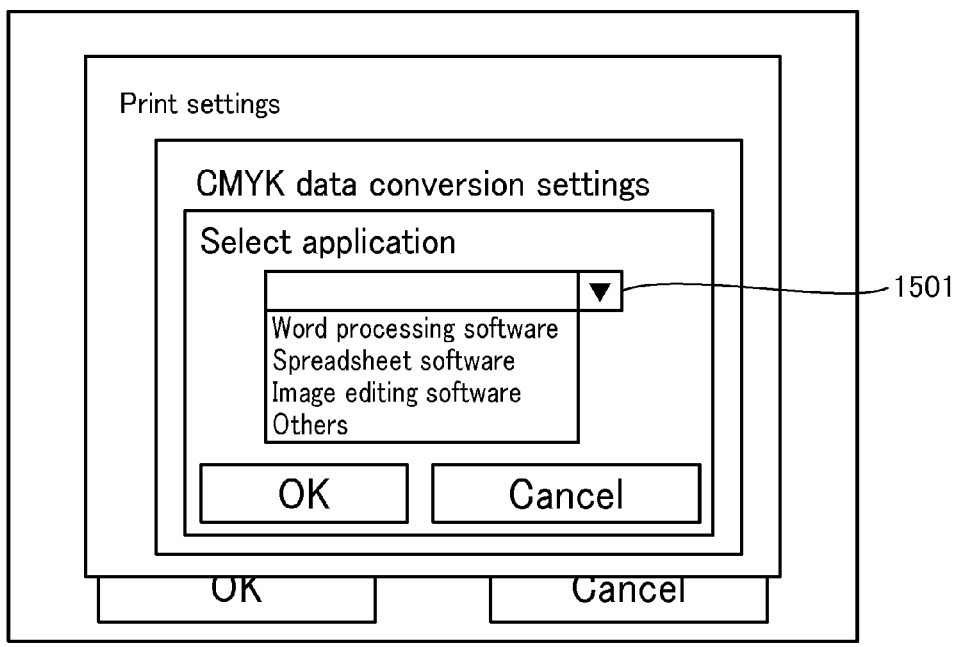
FIG. 16B is a diagram illustrating an application selection screen.

On the other hand, when it is determined in step S1203 that the processing is performed on the printer side, the processing proceeds to step S1206. The setting information processing unit 401 displays an application selection screen. For example, the UI screen shown in FIG. 16B is displayed. An application candidate list is displayed in a pull down menu format. The user performs a selection operation for selecting an application for displaying an image on a monitor screen. In step S1207, the setting information processing unit 401 transmits information about the application selected in step S1206 to the print data acquiring unit 402, and stores it in the external storage device 204. The processing from step S1208 to step S1212 is the same as that from step S705 to step S709 shown in FIG. 5 and the explanation thereof will be omitted.

Figure 15:
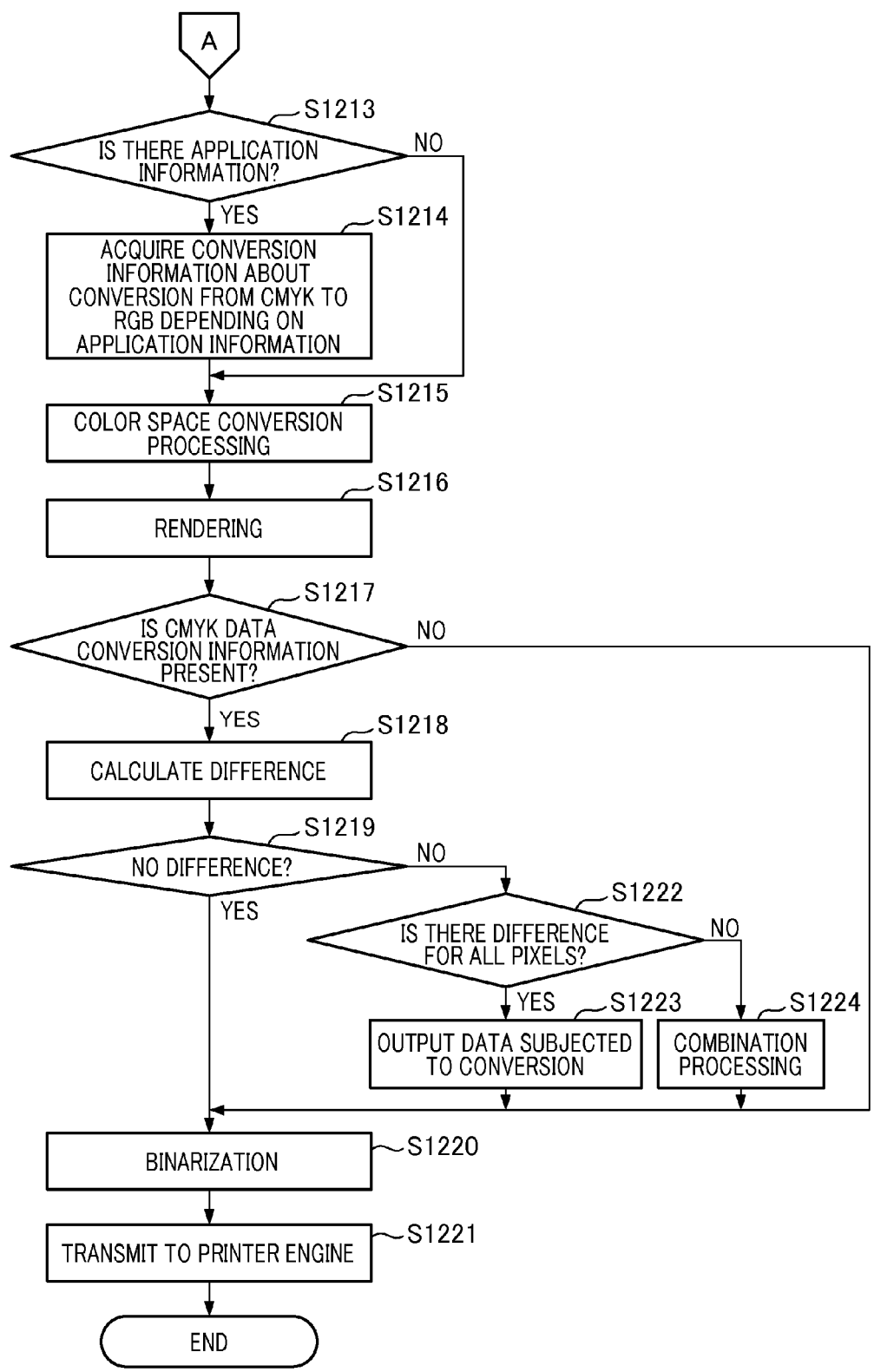
FIG. 15 is a flowchart illustrating the latter half of print processing in sequence of FIG. 14.

In step S1213 shown in FIG. 15, the color matching processing unit 607 determines whether or not there is information about the application transmitted in step S1207. When there is no information about the application, the processing proceeds to step S1215. In this case, the processing in steps S1215 and S1216 is the same as that in steps S710 and S711 shown in FIG. 5. The processing from step S1217 to step S1224 is the same as that from step S1712 to step S1719 shown in FIG. 9.

When it is determined in step S1213 that there is information about the application, the processing proceeds to step S1214, and the color matching processing unit 607 acquires conversion information (CMYK→RGB LUT) about conversion from CMYK to RGB depending on the application. The conversion information is created in advance and is stored in the external storage device 504. The method for creating conversion information (CMYK→RGB LUT) will be described below. In step S1215, the color matching processing unit 607 performs the color space conversion processing. In advance of the color space conversion processing, the conversion processing for converting CMYK data into RGB data is firstly executed. The color space conversion processing for duplicating print data acquired through the intermediary of the printer driver 303 and for converting CMYK data of the duplicate data using CMYK→RGB LUT is performed. As in the case of using the ICC profile, conversion is processed by calculation utilizing LUT. As in the first embodiment, conversion from RGB to CMYK utilizing the ICC profile is performed for original data serving as the duplication source data and duplicate data subjected to color space conversion. The explanation of the processing in step S1216 and subsequent steps will be omitted.

Figure 17:
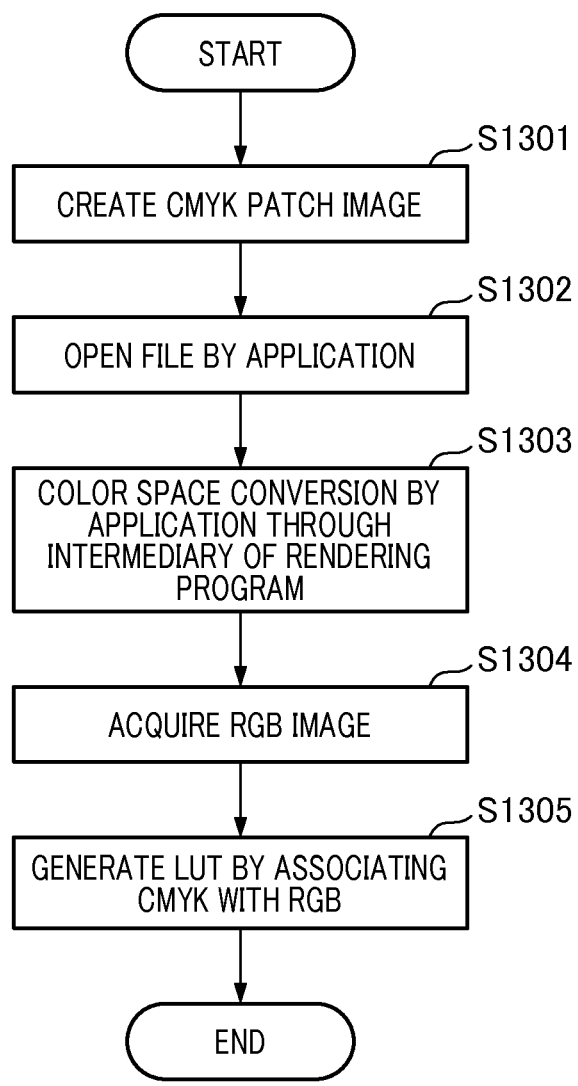
FIG. 17 is a flowchart illustrating color space conversion information creation processing.
Figure 18:
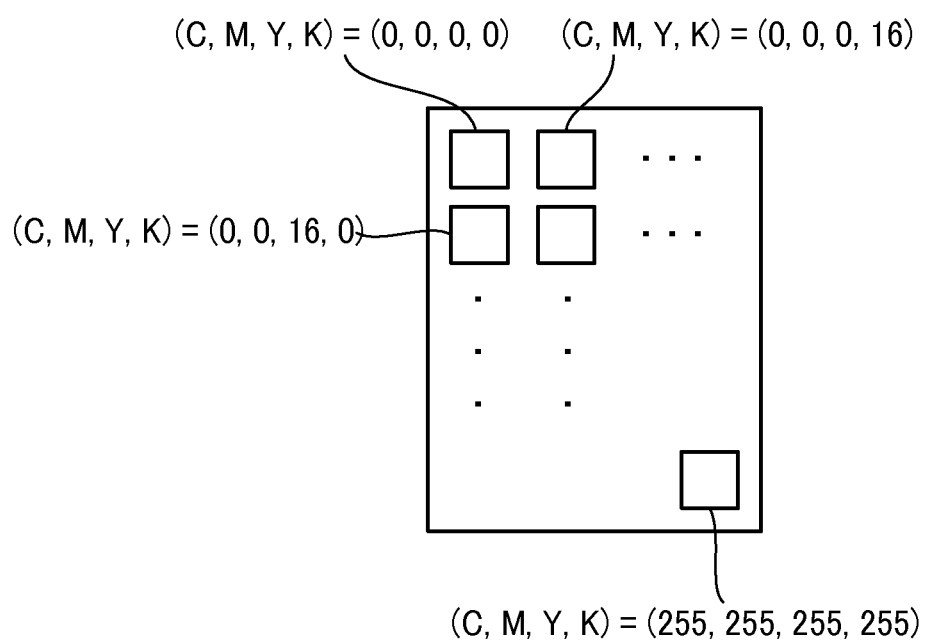
FIG. 18 is a diagram illustrating an example of a CMYK patch image.

Next, a description will be given of conversion information (CMYK→RGB LUT) creation processing with reference to FIG. 17. Firstly, a CMYK patch image is created in step S1301. As shown in FIG. 18, the CMYK patch image is an image constituted by evenly divided into the value of from 0 to 255 for each of C, M, Y, and K. In step S1302, the processing for opening a file of the patch image created in step S1301 is executed by an application through which CMYK→RGB LUT wants to be created. In step S1303, the application provides an instruction to perform printing through the intermediary of the rendering program 302, so that color space conversion from CMYK data to RGB data is executed. In step S1304, the printer driver 303 acquires the RGB data subjected to color space conversion, and stores it in the external storage device 204. In step S1305, the processing for associating the RGB data stored in step S1304 with CMYK data of the input patch image is performed, so that conversion information (CMYK→RGB LUT) is created.

In the present embodiment, although only an application for which conversion information (CMYK→RGB LUT) has been prepared in advance can handle, the processing for converting CMYK data into RGB data can be performed on the printer side. In this manner, the processing load on a computer can be decreased, resulting in an improvement in the processing speed of the entire print processing.

(OTHER EMBODIMENTS)

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-192245, filed on Sep. 17, 2013, which is hereby incorporated by reference herein in its entirety.

What is claimed is:

1. An image processing apparatus comprising:
    an accepting unit configured to accept a determination result of whether or not the color of input image data constituted by a CMYK color space is to be modified in accordance with a display device;
    a first color space converting unit configured to convert image data constituted by the CMYK color space into image data constituted by an RGB color space through an intermediary of a rendering program, if the determination result in which the modification is to be performed is accepted by the accepting unit;
    a second color space converting unit configured to convert image data constituted by the RGB color space into image data constituted by the CMYK color space; and
    a printing unit configured to print the image data constituted by the CMYK color space that is converted by the second color space converting unit;
    wherein, if the determination result in which the modification is not to be performed is accepted by the accepting unit, the printing unit prints the input image data constituted by the CMYK color space without performing the conversion by the first color space converting unit and the conversion by the second color space converting unit.

2. The image processing apparatus according to claim 1, wherein the first color space converting unit converts image data constituted by the CMYK color space into image data constituted by the RGB color space using the rendering program a program.

3. The image processing apparatus according to claim 1, wherein the second color space converting unit converts image data constituted by the RGB color space into image data constituted by the CMYK color space using an ICC profile.

4. The image processing apparatus according to claim 1, wherein the first color space converting unit converts image data constituted by the CMYK color space having a predetermined attribute into image data constituted by the RGB color space.

5. The image processing apparatus according to claim 4, wherein the predetermined attribute includes at least any one of image, graphics, and text.

6. An image processing method comprising:
accepting a determination result of whether or not the color of input image data constituted by a CMYK color space is to be modified in accordance with a display device;
converting, in a first color space converting step, image data constituted by the CMYK color space into image data constituted by an RGB color space through an intermediary of a rendering program, if the determination result that the modification is to be performed is accepted in the accepting step;
converting, in a second color space converting step, image data constituted by the RGB color space into image data constituted by the CMYK color space; and
printing the image data constituted by the CMYK color space that has been converted in the second color space converting step;
wherein, if the determination result that the modification is not to be performed is accepted in the accepting step, printing the input image data constituted by the CMYK color space, without performing the conversion in the first color space converting step and the conversion in the second color space converting step.

7. A non-transitory computer readable medium for storing a computer-readable program to be executed by a computed provided in an image processing apparatus, the program comprising:
accepting a determination result of whether or not the color of input image data constituted by a CMYK color space is to be modified in accordance with a display device;
converting, in a first color space converting step, image data constituted by the CMYK color space into image data constituted by an RGB color space through an intermediary of a rendering program, if the determination result that the modification is to be performed is accepted in the accepting step;
converting, in a second color space converting step, image data constituted by the RGB color space into image data constituted by the CMYK color space; and
printing the image data constituted by the CMYK color space that has been converted in the second color space converting step;
wherein, if the determination result that the modification is not to be performed is accepted in the accepting step, printing the input image data constituted by the CMYK color space, without performing the conversion in the first color space converting step and the conversion in the second color space converting step.

* * * * *